July 27, 1965 L. C. FINKLE 3,196,734
FASTENING DEVICE
Filed April 5, 1963
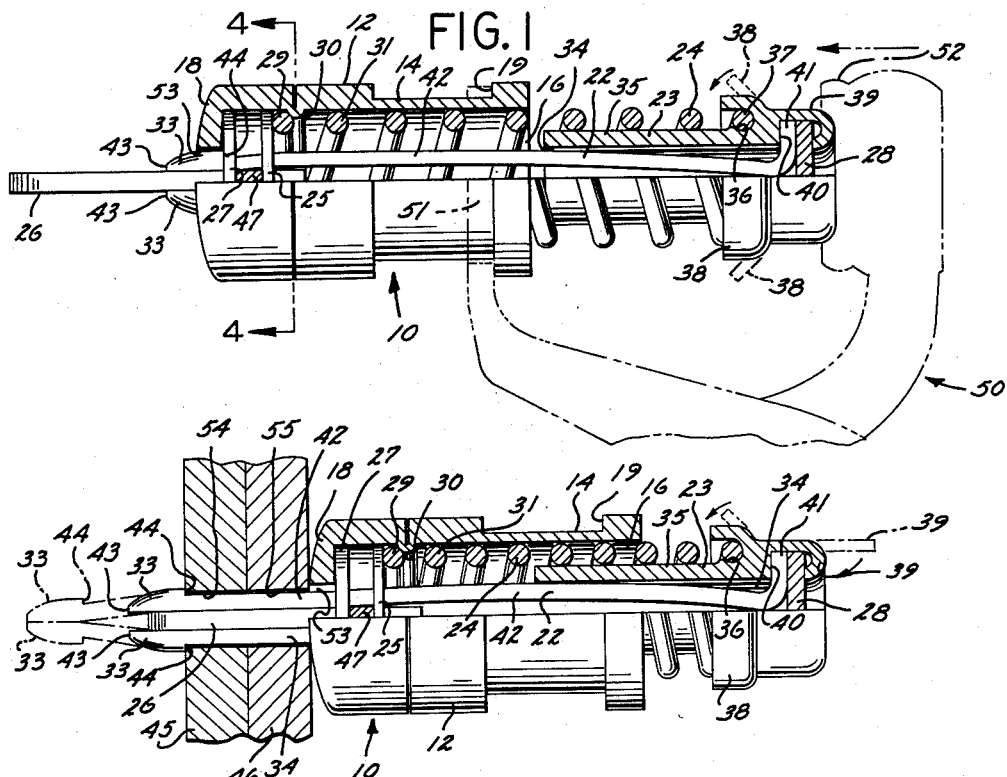
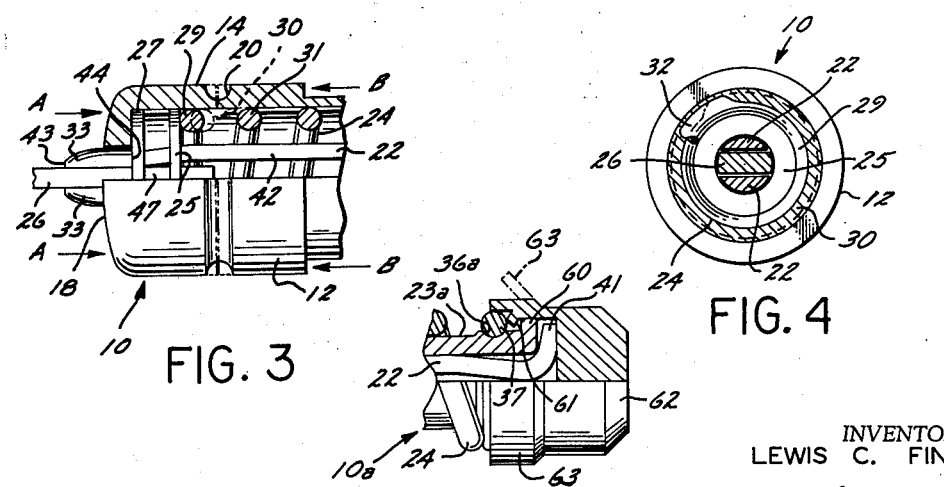
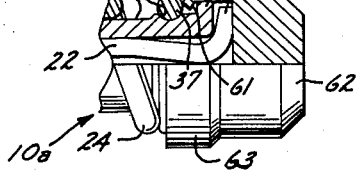
INVENTOR.
LEWIS C. FINKLE
BY R. E. Beaupre
ATTORNEY

United States Patent Office 3,196,734
Patented July 27, 1965

3,196,734
FASTENING DEVICE
Lewis C. Finkle, Temple City, Calif., assignor to Wedgelock Corporation of California, North Hollywood, Calif., a corporation of California
Filed Apr. 5, 1963, Ser. No. 270,938
1 Claim. (Cl. 85—81)

This invention relates to a fastening device and more particularly to an open-spring fastener of the type employed to temporarily hold plates or similar articles together during an assembly operation.

In the assembly of sheet metal plates and fasteners particularly in the aircraft industry, there is a need for holding the plates or fasteners during the assembly operation. One prior art fastening device used for this purpose employed a body portion which completely housed a pair of wires and a compression spring which biased a shoulder on the end of each wire into engagement with the plates to be held together. Since this type of fastening device is relatively expensive, a more economical type was developed wherein all or a portion of the housing was dispensed with thereby exposing the spring. This type of fastening device is known as the "open-spring" type. While generally satisfactory, the open-spring type of fastening device has the drawback that should the wires snap while the spring is under compression, the fastener will fly apart endangering nearby workmen.

Therefore, it is an object of the present invention to provide an improved open-spring type fastening device not subject to the disadvantage stated above.

Another object of the present invention is to provide an open-spring type fastening device wherein the spring is held captive at both ends so that the individual parts of the fastening device can not separate should the center wires break.

A further object of the present invention is to provide an open-spring type fastening device which is comparatively economical to maufacture and which may be used safely and expeditiously.

According to the present invention, an open-spring type fastening device is provided having an open topped body portion in which a pair of center wires, a spreader bar and a compression spring are mounted. The compression spring and the center wires extend out the open top with the center wires extending through the shank of a hollow rivet and the compression spring encompassing the shank of the rivet whereby the shank is free to enter the body portion when the spring is compressed. The lower end of the spring is maintained in the body portion by cutting an annular groove on the outer periphery of the body portion and compressing the body portion longitudinally in such a manner that material flows inwardly and locks around the lower coil of the spring. The upper coil of the spring is held captive by spinning the head of the rivet over the upper coil.

The features of the present invention which are believed to be novel are set forth with particularity in the appended claim. The present invention, both as to its organization and manner of operation, together with further objects and advantages thereof, may best be understood by reference to the following description, taken in connection with the accompanying drawings, in which:

FIGURE 1 is an elevational view, partly in cross section, of a fastening device of the present invention;

FIGURE 2 is an elevational view, partly in cross section, showing the fastening device of FIGURE 1 in engagement with a pair of plates to be held together by the fastening device;

FIGURE 3 is a partial elevational view, with parts shown in cross section, of a portion of the fastening device of FIGURE 1 during one stage in the manufacture thereof;

FIGURE 4 is a transverse cross-sectional view taken along line 4—4 of FIGURE 1; and FIGURE 5 is a partial elevational view, with parts shown in cross section, of a modification of the fastening device of FIGURE 1.

Referring again to the drawings, and particularly to FIGURES 1–4, the fastening device constituting a first embodiment of the present invention, generally designated 10, includes a body portion 12 having an encompassing side wall 14, an open top 16, an apertured bottom wall 18, and an external, annular shoulder 19. An annular groove 20 is machined into the encompassing side wall 14 (FIGURE 3) after which an assembly including a pair of center wires 22, a hollow rivet 23, a compression spring 24, a first washer 25, a spreader bar 26, and a second washer 27 may be inserted into body portion 12 with a lower coil 29 of spring 24 lying adjacent the annular groove 20. The lower end of the body portion 12 may then be compressed in the direction of the arrows A—A and B—B in FIGURE 3. This compression causes the material of the side wall 14 in the vicinity of the groove 20 to flow inwardly, forming an annular shoulder 30 on the inner surface of side wall 14 intermediate the lower coil 29 and the next adjacent coil 31. The material from side wall 14 will also flow around the diagonal portion 32 of spring 24 which connects lower coil 29 to the adjacent coil 31.

The center wires 22 include nose portions 33 which are of small enough diameter that they will pass through the cylindrical bore 34 in rivet 23. The hollow rivet 23 includes a shank portion 35 having a raised, external annular groove 36 near one end thereof which is engageable by expanding the upper coil 37 of spring 24. The rivet 23 also includes a 45° flange 38 which is spun over the upper coil 37 to maintain it in firm engagement with raised, external annular groove 36. The rivet 23 also includes an upper encompassing wall 39 forming a land 40 with the upper end of shank 35 upon which a turned-over head portion 41 of each wire 22 seats. The flat disc 28 may be placed on top of head portions 41 and the encompassing wall 39 spun over, as shown in FIGURE 2, to hold the disc 28 and head portions 41 captive inside encompassing wall 39.

Each center wire 22 includes a bowed shaft portion 42 in addition to the previously described turned-over head portion 41 and the nose portion 33. Each nose portion 33 has a rounded tip 43 and a shoulder 44. The shoulders 44 are engageable with a first plate 45 to be held in assembled relation with a second plate 46 by fastening device 10. Before the spring 24, center wires 22, and hollow rivet 23 are assembled into body portion 12, the first washer 25 is placed on the wires 22 so that the washer 25 will abut against lower coil 29 of spring 24 after it has been compressed to a solid position. The spreader bar 26 is then inserted through the aperture in the washer 25 and between the wires 22 spreading the nose portions 33 apart so that shoulders 44 will not pass through the aperture in washer 25. Spreader bar 26 includes a cross arm 47 which prevents the spreader bar 26 from passing through washer 25. The second washer 27 is then placed on wires 22 so that the cross arm 47 is held captive between the first washer 25 and the second washer 27.

A pair of pliers 50 (FIGURE 1) having a bifurcated portion 51 and a recessed portion 52 may be used to compress the spring 24 by engaging the flange 19 on body portion 12 with the bifurcated portion 51 and the spun-over wall 39 on rivet 23 with the recessed portion 52. The pliers 50 plunge the rivet 23 into body portion 12 causing the nose portions 33 of pins 22 to extend through an aperture 53 in apertured bottom wall 18 past the end of spreader bar 26 thereby permitting bowed shank portions 42 to bring the nose portions 33 together, as shown in broken lines in FIGURE 2. The nose portions 33 are then small enough in diameter to pass through apertures 54 and 55 in plates 45 and 46, respectively. When the pliers 50 are released, the pins 22 will be withdrawn sufficiently by spring 24 to bring shoulders 44 of pins 22 into firm engagement with plate 45 and apertured bottom wall 18 into firm engagement with the plate 46, thereby holding the plates together. It will be apparent that, should the wires 22 snap when the fastening device is in this position, the annular shoulder 30 will hold the lower end of spring 24 captive and the raised, external annular groove 36 and flange 38 will hold the upper end of spring 24 captive so that the parts comprising fastening device 10 can not fly apart.

Referring now to FIGURE 5, a modified fastening device 10a is shown wherein a rivet 23a includes a raised annular groove 36a engageable by expanding the upper coil 37 of spring 24. The rivet 23a also includes an upper flange 60 on the upper side of which the head portions 41 of center wires 22 may bear and the underside of which is engageable by spinning over a first flange 61 of a cap 62. The cap 62 includes a second flange 63 which may be spun over into engagement with the upper coil 37 of spring 24. The base of flange 63 forms a 45° angle with cap 62 to minimize fracturing between the flange 63 and the cap 62 when the flange is spun over into contact with the coil 37.

While the particular fastening devices herein shown and described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claim.

What is claimed is:

A fastening device comprising:

a body portion having an open end and a closed end;

an aperture in said closed end of said body portion;

spreadable wire means mounted in said body portion, said wire means comprising a pair of spreader wires each having an enlarged head extending through said aperture and a bowed shank extending out said open top;

a compressible spring having coils encompassing said wire means in said body portion and extending out said open top;

a hollow rivet encompassing said wire means and having a shank portion encompassed by said spring means, said rivet including means holding the upper coil of said spring captive;

an internal annular shoulder mounted in said body portion intermediate adjacent lower end coils on said spring to hold said spring captive in said body portion;

said upper coil holding means comprising a raised, external annular groove on said hollow rivet for securing said upper coil after expansion thereof and flange means on said rivet overlying said upper coil for maintaining said coil in firm engagement with said groove;

said groove being raised radially outwardly relative to said rivet shank portion and said flange means extending axially and engaging the surface of said upper coil;

each of said wires extending through said open top terminating in a turned-over head portion comprising an outwardly extending end portion of said wire, said hollow rivet comprising a land portion in the form of an annular shoulder located adjacent said head portions for seating one side of said head portions; and a second rivet portion positioned adjacent the other side of said head portions after said head portions are seated for securing said head portions to said hollow rivet;

said second rivet portion including a flat surface engaging the turned-over head portions.

References Cited by the Examiner

UNITED STATES PATENTS

| | | | |
|---|---|---|---|
| 2,349,872 | 5/44 | Lipp | 85—81 |
| 2,410,664 | 11/46 | Lawlor | 85—81 |
| 2,440,341 | 4/48 | Lehman | 85—81 |
| 2,454,416 | 11/48 | Van Sittert | 85—81 |

EDWARD C. ALLEN, *Primary Examiner*.